US010664407B2

(12) United States Patent
Gupta et al.

(10) Patent No.: US 10,664,407 B2
(45) Date of Patent: May 26, 2020

(54) DUAL FIRST AND SECOND POINTER FOR MEMORY MAPPED INTERFACE COMMUNICATION WITH LOWER INDICATING PROCESS

(71) Applicant: Intel Corporation, Santa Clara, CA (US)

(72) Inventors: Anant Raj Gupta, Singapore (SG); Ingo Volkening, Singapore (SG); Jun Ye Zhou, Singapore (SG)

(73) Assignee: Intel Corporation, Santa Clara, CA (US)

( * ) Notice: Subject to any disclaimer, the term of this patent is extended or adjusted under 35 U.S.C. 154(b) by 48 days.

(21) Appl. No.: 15/992,725

(22) Filed: May 30, 2018

(65) Prior Publication Data

US 2019/0004963 A1 Jan. 3, 2019

(30) Foreign Application Priority Data

Jun. 30, 2017 (EP) .................................... 17179112

(51) Int. Cl.
*G06F 12/10* (2016.01)
*G06F 13/16* (2006.01)
*G06F 13/42* (2006.01)
*G06F 5/12* (2006.01)
*G06F 3/06* (2006.01)

(52) U.S. Cl.
CPC ............ *G06F 12/10* (2013.01); *G06F 3/0656* (2013.01); *G06F 5/12* (2013.01); *G06F 13/1673* (2013.01); *G06F 13/4282* (2013.01); *G06F 2212/1008* (2013.01); *G06F 2213/0026* (2013.01)

(58) Field of Classification Search
CPC ................. G06F 12/10; G06F 13/1673; G06F 2212/1008; G06F 2213/0026; G06F 13/4282; G06F 5/12; G06F 3/0656
USPC ...... 710/52, 313; 711/109, 147; 365/189.05, 365/189.01, 189.04, 189.011
See application file for complete search history.

(56) References Cited

U.S. PATENT DOCUMENTS 4,833,651 A * 5/1989 Seltzer ...................... G06F 5/10 365/189.07
6,385,672 B1 5/2002 Wang et al.
6,553,448 B1 * 4/2003 Mannion .................. G06F 5/10 341/98
7,480,303 B1 * 1/2009 Ngai .................... H04L 49/351 370/395.5

(Continued)

OTHER PUBLICATIONS

European Search Report dated Sep. 18, 2017 for European Patent Application 17179112.2.

*Primary Examiner* — Hong C Kim
(74) *Attorney, Agent, or Firm* — Yong Beom Hwang; 2SPL Patent Attorneys

(57) ABSTRACT

A set of data entries is transferred via a memory mapped interface from an external peripheral device to a processor device and is stored in a shared memory region. Based on a first pointer to the shared memory region, a first process executed by the processor device processes a first group of the data entries. Based on a second pointer to the shared memory region, a second process executed by the processor device processes a second group of the data entries. The second process indicates the second pointer to the first process. The first process indicates a lower one of the first pointer and the second pointer to the peripheral device.

22 Claims, 6 Drawing Sheets

331 Rx Process 6 Input Ring Tx Index Tx Wrap Around Count Input Ring Read Index Input Ring Rx Index Rx Wrap Around Count Input Ring Size 9 PCIe Networking Device 5 Input Ring Read Index Input Ring Tx Index Tx Wrap Around Count 8 321 0 Input Ring Input Ring Write Index Input Ring Read Index IPI 4 3 Tx Process 7 2 Input Ring Read Index Input Ring Tx Index Tx Wrap Around Count 6 Input Ring Size 322 Output Ring Input Ring Size 332 310 350 1 MSI

(56) References Cited

U.S. PATENT DOCUMENTS

| | | | | |
|---|---|---|---|---|
| 7,539,142 | B1 * | 5/2009 | Gurley | H04L 12/4625 370/235 |
| 8,416,793 | B2 * | 4/2013 | Jones | G06F 5/14 370/379 |
| 2003/0177318 | A1 | 9/2003 | Picraux et al. | |
| 2014/0149694 | A1 | 5/2014 | Lee et al. | |
| 2017/0257518 | A1 * | 9/2017 | Matsunaga | G06F 5/065 |
| 2018/0101494 | A1 * | 4/2018 | Davis | G06F 13/385 |

* cited by examiner

DUAL FIRST AND SECOND POINTER FOR MEMORY MAPPED INTERFACE COMMUNICATION WITH LOWER INDICATING PROCESS

REFERENCE TO RELATED APPLICATION

This application claims priority to European Patent Application No. 17179112.2, filed on Jun. 30, 2017, which is hereby incorporated herein by reference in its entirety.

FIELD

The present application relates to communication of data from an external peripheral device to multiple processes executed by a processor device, and corresponding processor devices, systems and computer programs.

BACKGROUND

For communication between a host device and an external peripheral device, it is known to use a memory mapped interface between the host device and the peripheral device, e.g., a PCIe (Peripheral Components Interconnect Express) interface. Using the memory mapped interface, the peripheral device can directly write data into a memory of the host device or read data from the memory of the host device. In this way, the peripheral device may efficiently communicate with one or more processes executed by the host device.

For communication from the peripheral device to two processes executed by the host device, the memory of the processor device may be configured with a corresponding interface memory ring for each of the processes. The peripheral device may then transfer data to a given one of the processes by writing the data into the corresponding interface memory ring. However, configuring multiple interface memory rings may result in inefficient utilization of resources. Another possibility would be to utilize just one interface memory ring, from which one of the two processes, referred to as master process, copies the data intended for the other process into a further memory ring. However, the latter option may cause additional latency for the other process.

Accordingly, there is a need for techniques which allow for efficient communication of data between a processor device and an external peripheral device.

SUMMARY

According to an embodiment, a method of communicating data is provided. According to the method a processor device stores a set of data entries in a shared memory region. The data entries are, or have been, transferred via a memory mapped interface from an external peripheral device. Based on a first pointer to the shared memory region, a first process executed by the processor device processes a first group of the data entries. Based on a second pointer to the shared memory region, a second process executed by the processor device processes a second group of the data entries. The second process indicates the second pointer to the first process. The first process indicates a lower one of the first pointer and the second pointer to the peripheral device.

According to an embodiment, the second process accomplishes indicating of the second pointer to the first process in response to completing processing of each data entry of the second group or in response to each incrementing of the second pointer.

According to an embodiment, the first process accomplishes indicating the lower one of the first pointer and the second pointer to the peripheral device in response to processing of the data entries of the first group being finished, e.g., when all available data entries have been processed, in response to a timeout, or in response to reaching a configured maximum number of processed items.

According to an embodiment, the processing of the first group of the data entries by the first process and the processing of the second group of the data entries by the second process is performed simultaneously.

According to an embodiment, the processing of the first group of the data entries by the first process and the processing of the second group of the data entries by the second process are triggered simultaneously by an interrupt generated by the peripheral device.

According to an embodiment, the processing of the first group of the data entries by the first process and the processing of the second group of the data entries by the second process are triggered by a first interrupt message from the peripheral device to one of the first process and the second process, and by a second interrupt message from the one of the first process and the second process to the other of the first process and the second process.

According to an embodiment, the shared memory region is configured as a ring buffer. In this case, the first pointer and the second pointer may be controlled in a cyclic manner. This may involve resetting the first pointer in response to reaching a maximum value and/or resetting the second pointer in response to reaching a maximum value.

According to an embodiment, one of the first process and the second process comprises a data reception process, while the other one of the first process and the second process comprises a data sending process.

According to an embodiment, the peripheral device is a networking device, e.g., a networking device supporting at least one of a WLAN (Wireless Local Area Network) communication technology, an Ethernet communication technology, a DSL (Digital Subscriber Line) communication technology, an LTE (Long Term Evolution) cellular radio technology, and an 5G ($5^{th}$ Generation) cellular radio technology.

According to an embodiment, the indicated lower one of the first pointer and the second pointer is to be used by the peripheral device for controlling writing of further data entries into the shared memory region.

According to an embodiment, the memory mapped interface is based on a PCIe (Peripheral Component Interconnect Express) interface or an AMBA (Advanced Microcontroller Bus Architecture) interface.

According to a further embodiment, a processor device is provided. The processor device comprises a memory, a memory mapped interface to an external peripheral device, and at least one processor. The at least one processor is configured to execute a first process and a second process. The memory is configured to store a set of data entries in a shared memory region. The data entries are or have been transferred via the memory mapped interface from the peripheral device. The first process is configured to process a first group of the data entries based on a first pointer to the shared memory region. The second process is configured to process a second group of the data entries based on a second pointer to the shared memory region. The second process is configured to indicate the second pointer to the first process. The first process is configured to indicate a lower one of the first pointer and the second pointer to the peripheral device.

According to an embodiment, the processor device is configured to perform the steps of the above method.

According to a further embodiment a system is provided. The system comprises a processor device as described above and the external peripheral device.

According to a further embodiment, a computer program or computer program product is provided, e.g., in the form of a computer readable medium. The computer program comprises instructions to be executed by at least one processor of a processor device. Execution of the instructions causes the processor device to perform the above described method.

The above summary is merely intended to give a brief overview over some embodiments and is not to be construed as limiting, as other embodiments may employ other features.

DETAILED DESCRIPTION

Figure 1:
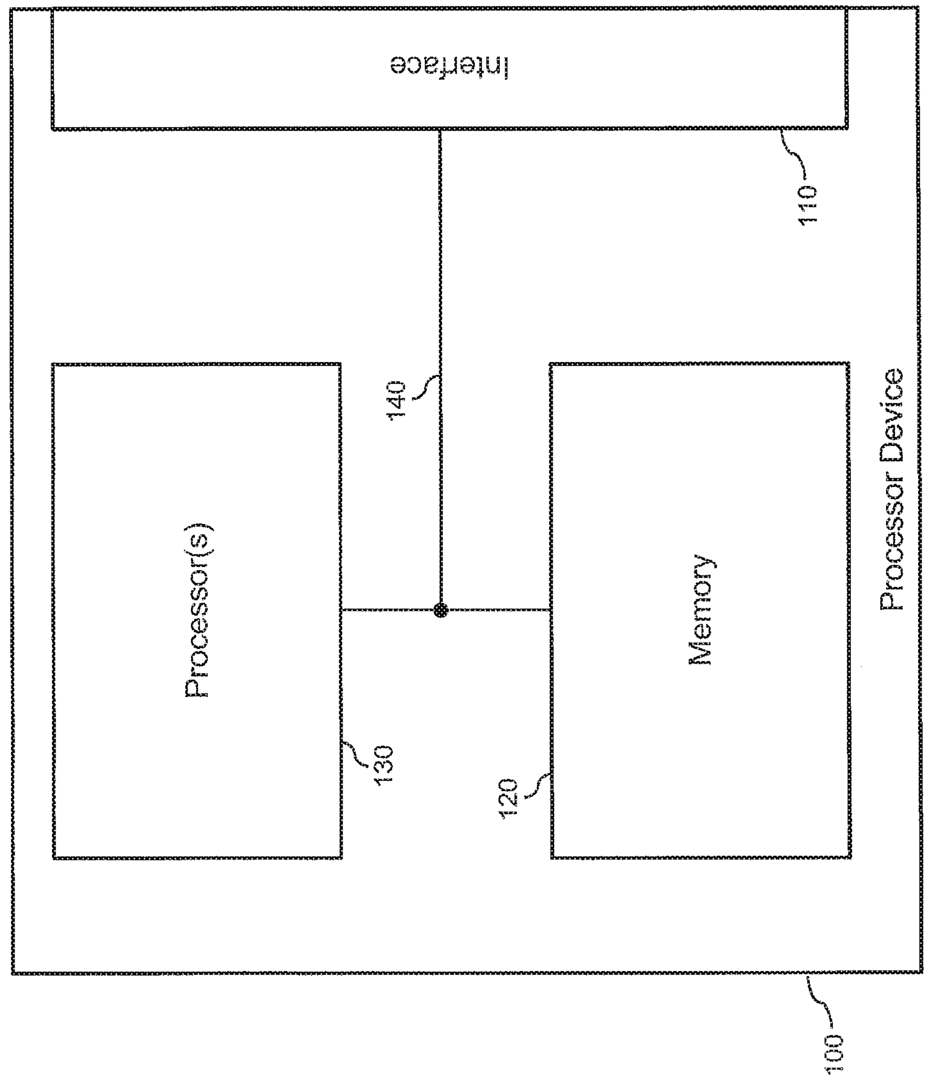
FIG. 1 illustrates a processor device according to an embodiment.

In the following, various embodiments will be discussed referring to the attached drawings. It should be noted that these embodiments are given as illustrative examples only and are not to be construed as limiting. For example, while embodiments may be described as comprising a plurality of features or elements, this is not to be construed as indicating that all these features or elements are necessary for an implementation. Instead, in other embodiments, some of these features or elements may be omitted, and/or may be replaced by alternative features or elements. In addition to the features or elements explicitly shown in the drawings or described herein, other features or elements, for example features or elements used in conventional processor devices, may be provided.

FIG. 1 illustrates a processor device 100 according to an embodiment. The processor device 100 may for example correspond to an SoC (System on a Chip) or a mainboard system of a computer. As illustrated, the processor device 100 includes an interface 110, a memory 120, and one or more processors 130. The interface 110, the memory 120, and the processor(s) 130 are connected by a bus system 140 which enables communication between the interface 110 and the memory 120, communication between the interface 110 and the processor(s) 130, and communication between the memory 120 and the processor(s) 130. The interface 110 for example be a based on a PCIe interface or an AMBA (Advanced Microcontroller Bus Architecture) interface. The memory 120 may include a RAM (random access memory), e.g., and SRAM (Static RAM) or a DRAM (Dynamic RAM). However, other rewritable memory types could be used as well. The processor(s) may include one or more single core processors or one or more multi-core processors. Various processor architectures may be used in the processor(s), e.g., an x86 architecture or an ARM architecture.

The interface 110 is assumed to support memory mapped input from one or more external peripheral devices and/or output of data to one or more external peripheral devices. The interface 110 will therefore in the following also be referred to as memory mapped interface. In the case of memory mapped input, data is communicated from the peripheral device to the processor device 100, which involves that the peripheral device writes the data into a certain memory region monitored by the processor(s) 130. In the case of memory mapped output, data is communicated from the processor(s) to the peripheral device to, which involves that the processor(s) 130 write(s) the data into a certain memory region monitored by the peripheral device.

Embodiments as further detailed below specifically relate to memory mapped input from the peripheral device to multiple processes executed by the processor device 100. This will be explained by referring to an example involving two processes. However, it is noted that the illustrated concepts could also be applied to scenarios where the peripheral device communicates with more than two processes executed by the processor device 100.

For efficiently implementing the memory mapped input to the processes, a single memory region is shared by the different processes. The peripheral device writes the data for both processes into the shared memory region, and both processes individually read the data from the shared memory region. Each process uses an individual read pointer for reading the data. One of the processes may act as a master process and provide the peripheral device with updated information concerning the progress of reading data from the shared memory region. In the illustrated examples, it is assumed that the shared memory region is configured as a circular or ring buffer, in the following also referred to as "ring", which means that read pointers used for reading data from the shared memory region and a write pointer used for writing to the shared memory region are controlled in a cyclic manner. However, it is noted that the shared memory region could also be configured as a non-circular buffer.

Figure 2:
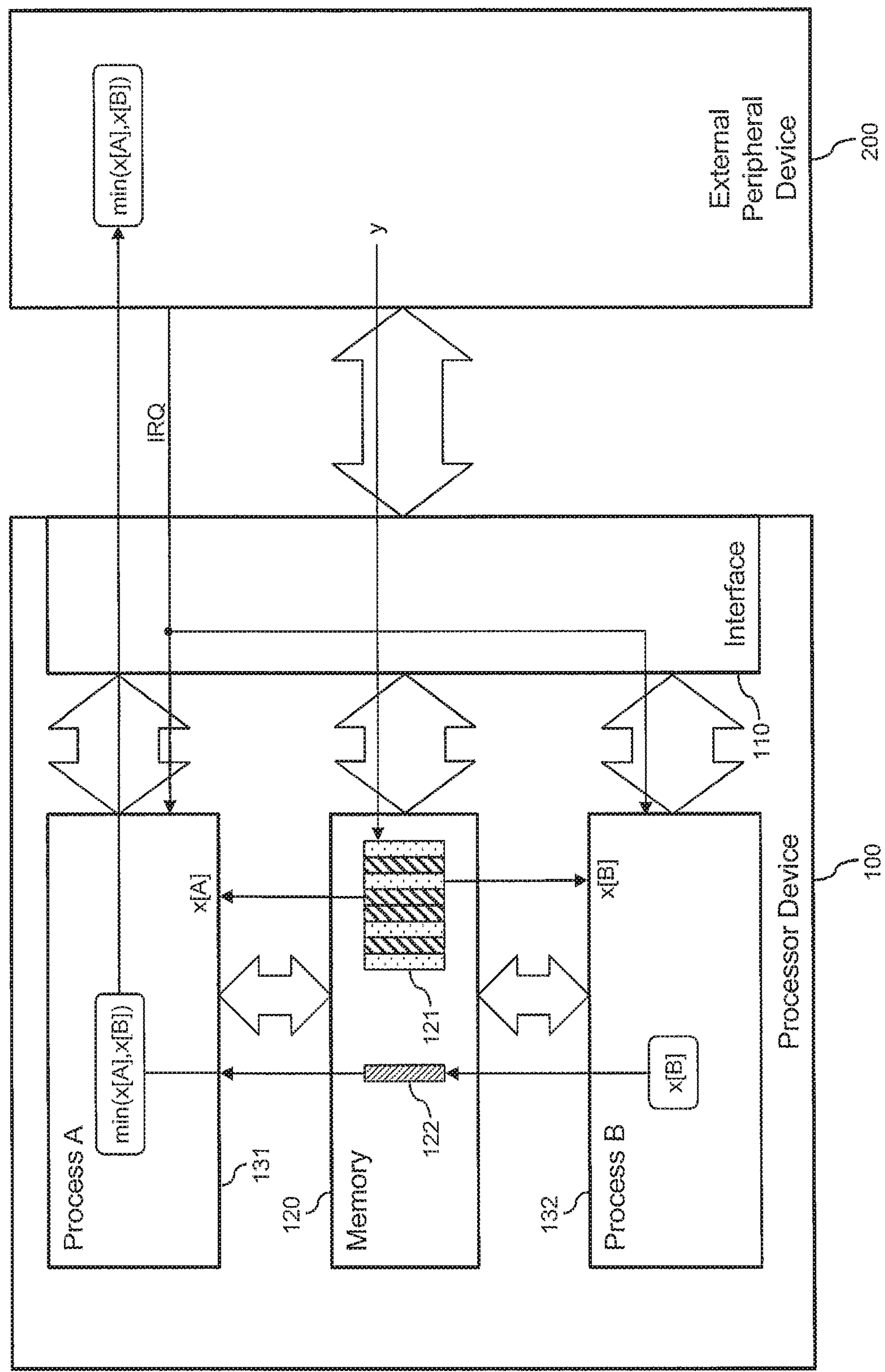
FIG. 2 shows a block diagram for illustrating memory mapped data communication according to an embodiment.

FIG. 2 illustrates further illustrates the communication of data between an exemplary external peripheral device 200 and the processor device 100. As explained above, the processor device 100 executes a first process 131 and a second process 132. In the following, the first process 131 will also be referred to as "process A", and the second process 132 will also be referred to as "process B". The process A is assumed to be a master process which is responsible for communicating information related to management of the data communication to the peripheral device 200. As a memory region shared by both the process A and the process B, a ring 121 is configured in the memory 120. The peripheral device 200 uses a write pointer y for writing data into the ring 121. The written data include a first group of data entries which are to be processed by the process A and a second group of data entries which are to be processed by the process B. These data entries may have an arbitrary order. Having written the data into the ring 121, the peripheral device 200 triggers processing of the data in the ring 121 by generating an interrupt (IRQ) to both the process A and the process B.

During processing of the data, the process A uses a read pointer x[A] for individually reading data from the ring 121. The process B uses a read pointer x[B] for individually reading data from the ring 121. Each time the process A reads a data entry from the ring 121, it increments the read pointer x[A]. Similarly, the process B increments the read pointer x[B] each time it reads a data entry from the ring 121. While reading the data from the ring 121, processes the data entries of the first group, and the process B processes the data entries of the second group. Accordingly, the processing of the data by the process A may be accomplished simultaneously with the processing of the data by the process B.

As further illustrated, the process B keeps the process B updated about the status of its read pointer x[B] by indicating the current status of the read pointer x[B] to the process A. This may be accomplished each time the read pointer x[B] is incremented in response to reading a data entry from the ring 121. As illustrated, the process B may indicate the status of its read pointer by writing the status of the read pointer x[B] into a location 122 configured in the memory 120, and the process A may then read the status of the read pointer x[B] from this memory location 122.

In response to the process A finishing processing the data entries of the first group, the process A compares its own read pointer x[A] to the read pointer x[B] of the process B, and indicates the lower one of the read pointer x[A] and the read pointer x[B] to the peripheral device 200. The peripheral device 200 may then deduce from the indicated read pointer which data entries were processed by the process A and the process B and also use the indicated read pointer for controlling writing of further data entries into the ring 121, while avoiding that data entries are left unprocessed. As a result, communication of the data entries via the ring 121 may be managed in an efficient manner.

Figure 3:
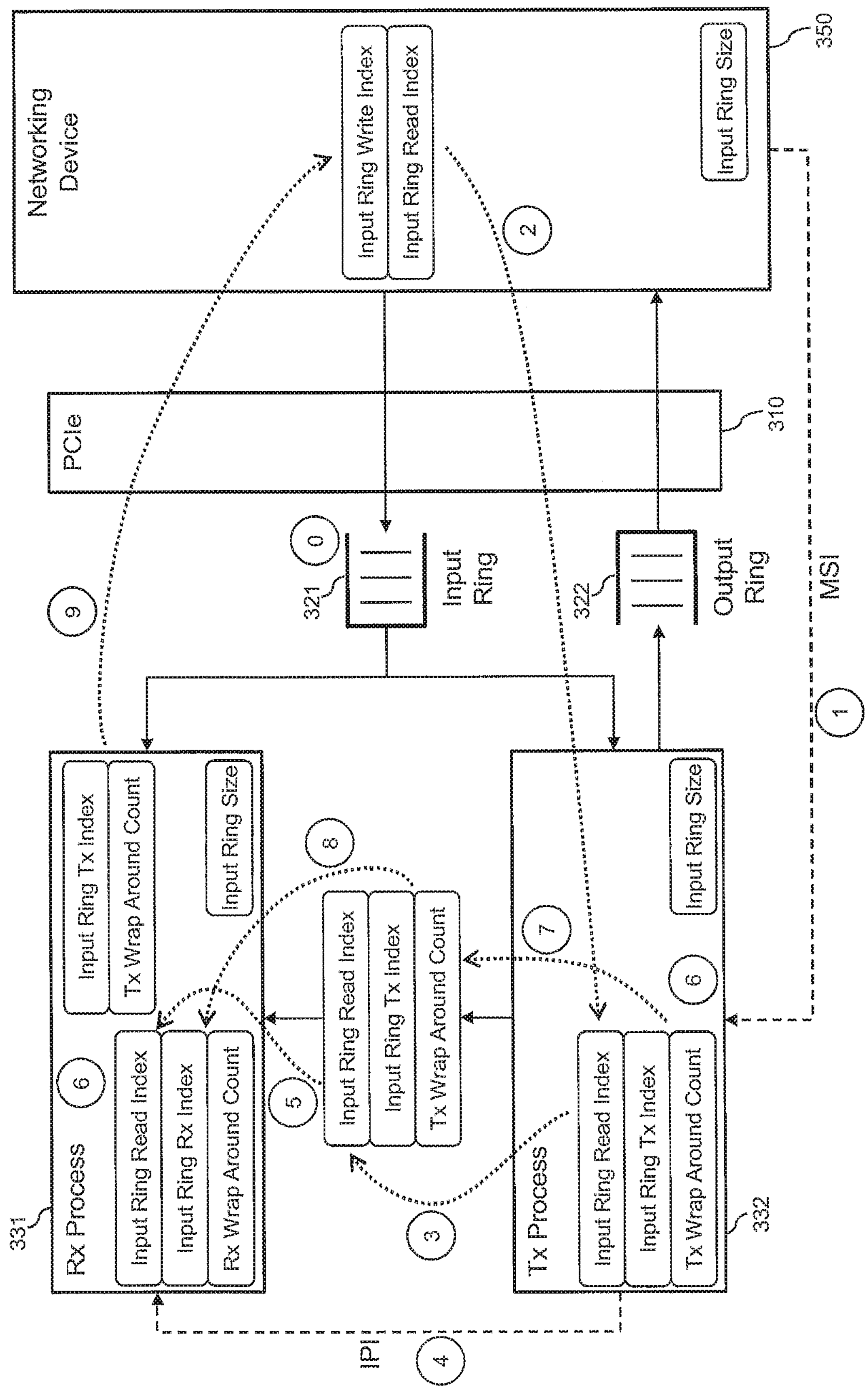
FIG. 3 shows an example of a data communication procedure according to an embodiment.

FIG. 3 shows an example of a data communication procedure which is implemented on the basis of concepts as outlined above. In the example of FIG. 3, it is assumed that an external peripheral device in the form of a networking device 350 uses a PCIe interface for memory mapped communication of data with an Rx (receiving) process 331 and a Tx (sending process) executed by a processor device, e.g., the above mentioned processor device 100. The networking device 350 may for example support network communication according to one or more communication technologies, such as WLAN (Wireless Local Area Network), Ethernet, DSL (Digital Subscriber Line), or a cellular radio technology like LTE (Long Term Evolution).

In the procedure of FIG. 3, the Rx process 331 may operate like explained above for the process A, and the Tx process 332 may operate like explained above for the process B. Similar to the above mentioned ring 121, the procedure of FIG. 3 uses an input ring 321 for communication of data from the networking device 350 to the Rx process 331 and the Tx process 332. Further, an output ring 322 may be provided for communication of data from the Tx process 332 to the networking device 350. As illustrated by circular labels in FIG. 3, the procedure includes the following sub-procedures:

0. The networking device 350 writes data entries into the input ring 321. These data entries include messages to be processed by the Rx process 331 and the Tx process 332 and are thus also referred to as message entries. Further, networking device 350 writes descriptors into the input ring which allow for distinguishing between data entries to be processed by the Rx process 331 and data entries to be processed by the Tx process 332. The input ring 321 for example be organized in a message ring including the message entries and a descriptor ring including a descriptors for each of the message entries.

1. The networking device generates an MSI (Message Signaled Interrupt) to the Tx process 332.

2. Across the PCIe interface 310, the Tx process 332 gets an Input Ring Read Index from the networking device 350. The Input Ring Read Index indicates the last data entry written into the input ring 321.

3. The Tx process 332 writes the Input Ring Read Index to a shared memory location, similar to the above-mentioned memory location 122. Further, the Tx process 332 updates the shared memory location with a current local read pointer status for the input ring 321. The local read pointer status of the Tx process 332 includes an Input Ring Tx index and a Tx Wrap Around Count.

4. The Tx process 332 generates an IPI (Inter Processor Interrupt) to the Rx process 331.

5. The Rx process 331 reads the Input Ring Read Index, the Input Ring Tx index, and the Tx Wrap Around Count from the shared memory location.

6. The Rx process 331 and the Tx process 332 simultaneously read and process data entries from the input ring 321. For this purpose the Tx process 332 uses its local read pointer defined by the Input Ring Tx Index and the Tx Wrap Around Count. Similarly, the the Rx process 331 uses a local read pointer defined by an Input Ring Rx Index and an Rx Wrap Around Count. Each time the Rx process 331 reads a data entry from the input ring 321, it increments its local read pointer. This involves incrementing the Input Ring Rx Index or, if the Input Ring Rx Index has reached a value corresponding to a size of the input ring 321, indicated by a globally configured parameter referred to as Input Ring Size, resetting the Input Ring Rx Index to zero and incrementing the Rx Wrap Around Count. Similarly, each time the Tx process 332 reads a data entry from the input ring 321, it increments its local read pointer. This involves incrementing the Input Ring Tx Index or, if the Input Ring Tx Index has reached, a value corresponding to the size of the input ring 321 as indicated the Input Ring Size, resetting the Input Ring Tx Index to zero and incrementing the Tx Wrap Around Count.

The processing of the data entries involves that the Rx process 331 first uses its local read pointer to read an descriptor from the descriptor ring and check if the corresponding message entry is valid for the Rx process 331, i.e., is intended to be processed by the Rx process 331. If the message entry is valid, the Rx process 331 reads the corresponding message entry from the input ring 321 for processing. Similarly, the Tx process 332 first uses its local read pointer to read a descriptor from the descriptor ring and check if the corresponding message entry is valid for the Tx process 332, i.e., is intended to be processed by the Tx process 332. If the message entry is valid, the Tx process 332 reads the corresponding message entry from the input ring 321 for processing.

7. Each time the Tx process increments its local read pointer, it updates the status of its local read pointer in the shared memory, i.e., writes the current Input Ring Tx Index and Tx Wrap Around Count to the shared memory location configured for this purpose.

8. At some point, the Rx process 331 ends the processing of data entries, e.g., if all data entries have been processed, in response to a timeout, or in response to reaching a configured maximum number of processed messages. At this point, the Rx process 331 reads the Input Ring Tx Index and the Tx Wrap Around Count from the shared memory location.

9. The Rx process compares a first read pointer position defined by the Input Ring Tx Index and the Tx Wrap Around Count to a second read pointer position defined by the Input Ring Rx Index and the Rx Wrap Around Count and uses the lower one of the two read pointer positions to update an Input Ring Write Index across the PCIe interface 310. Here, it is noted that if the Tx Wrap Around Count is lower than the Rx Wrap Around Count, the first read pointer position will be considered as the lower one, while if the Rx Wrap Around Count is lower than the Tx Wrap Around Count, the second read pointer position will be considered as the lower one. If the Tx Wrap Around Count and the Rx Wrap Around Count are the same and the Input Ring Tx Index is lower than the Input Ring Rx Index, the first read pointer position will be considered as the lower one. If the Tx Wrap Around Count and the Rx Wrap Around Count are the same and the Input Ring Rx Index is lower than the Input Ring Tx Index, the second read pointer position will be considered as the lower one.

Figure 4:
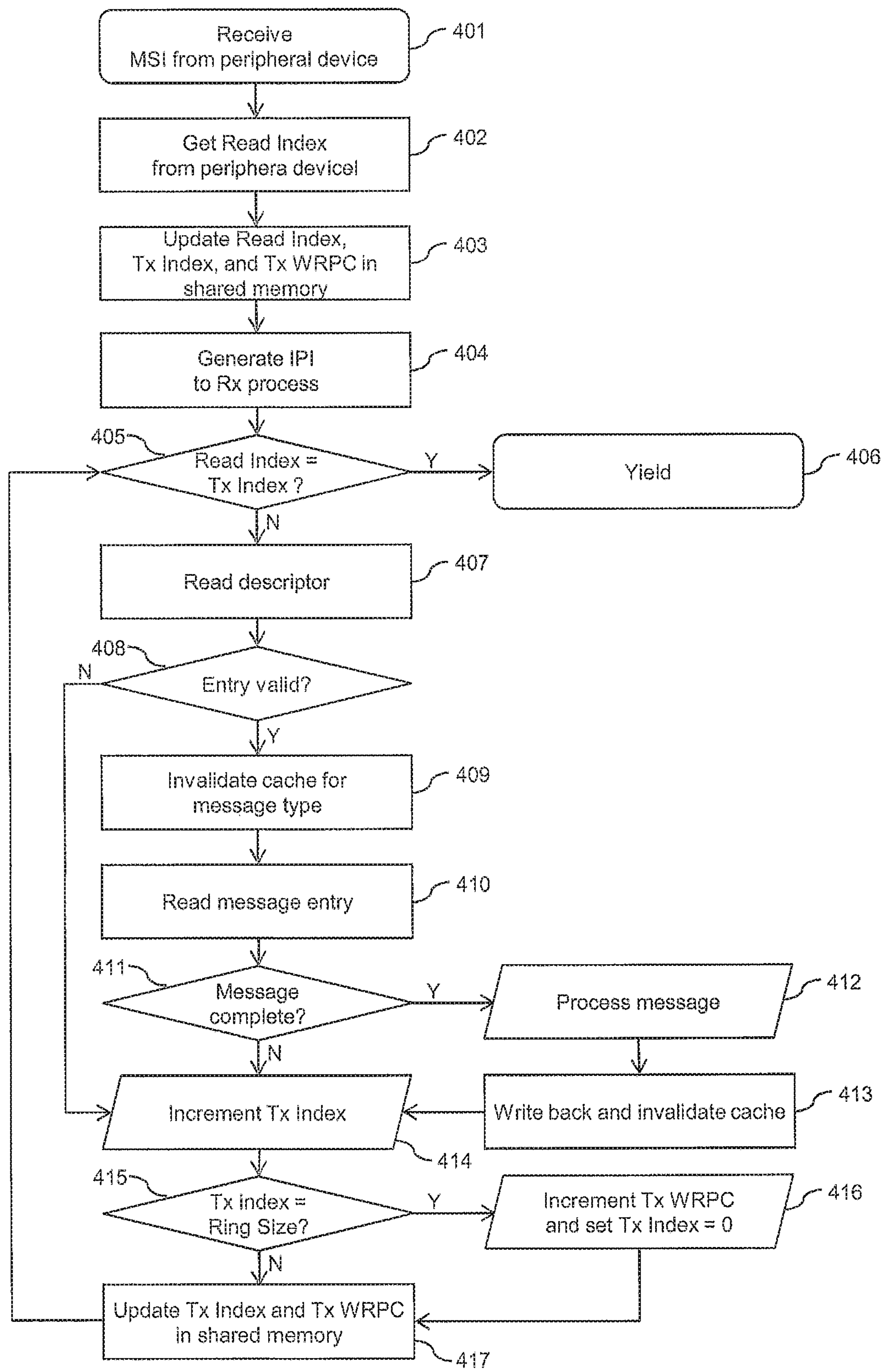
FIG. 4 shows a flowchart for illustrating a method implemented by a transmit process of the procedure.

FIG. 4 shows a flowchart for illustrating a method for implementing the procedure of FIG. 3 in the Tx process 331.

At step 401 the Tx process 332 receives the MSI from the peripheral device, at step 402 the Tx process 332 gets the Input Ring Read Index from the peripheral device, and at step 403 the Tx process 332 updates the shared memory location with the Input Ring Read Index and the current Input Ring Tx Index and Tx Wrap Around Count (Tx WRPC). At step 404, the Tx process 332 generates the IPI to the Rx process 332.

At step 405, the Tx process 332 checks if the Input Ring Tx Index is equal to the Input Ring Read Index. If this is the case, the Tx process 332 finishes processing and continues to step 406 to yield processing results, as indicated by branch "Y". If the Input Ring Tx Index is not equal to the Input Ring Read Index, the Tx process 332 continues to step 407, as indicated by branch "N".

At step 407, the Tx process 332 uses the Input Ring Tx Index to read a descriptor from the descriptor ring and then proceeds to step 408 to check, based on the descriptor, if a message entry associated with the descriptor is valid for the Tx process 332, i.e., if the message entry is intended for processing by the Tx process 332. If this is the case, the Tx process 332 continues to step 409, as indicated by branch "Y". The descriptor may also indicate a message type included in the associated message entry.

At step 409, the Tx process 332 may invalidate a cache provided for the message type included in the message entry before reading the message entry at step 410. For reading the message entry, the Tx process 332 may again use the Input Ring Tx Index. That is to say, the Input Ring Tx Index may point both to the message entry and to the associated descriptor.

Having read the message entry, the Tx process 332 checks at step 411 if reading of a message is complete. In this way, it can be taken into account that multiple message entries may be needed for transferring one message. If reading of the message is complete, the Tx process 332 proceeds to step 412, as indicated by branch "Y".

At step 412, the Tx process 332 processes the message. At step 413, the Tx process 332 writes back results of the processing to the memory 120 of the processor device 100 and then invalidates the cache used during the processing of the message. The Tx process 332 then proceeds to step 414.

At step 414, the Tx process 332 increments the Input Ring Tx Index. At step 415, the Tx process 332 checks if the incremented Input Ring Tx Index is equal to the configured Input Ring Size. If this is the case, the Tx process 332 proceeds to step 416 to reset the Input Ring Tx Index to zero and increment the Tx WRPC, as indicated by branch "Y". At step 417, the Tx process 332 then updates the Input Ring Tx Index and the Tx WRPC in the shared memory location.

If at step 415 the Input Ring Tx Index not yet equal to the Input Ring Size, the Tx process 332 proceeds directly to step 417, without the resetting of the Input Ring Tx Index and the incrementing of the Tx WRPC of step 416, as indicated by branch "N".

Having updated the Input Ring Tx Index and the Tx WRPC in the shared memory location, the Tx process 332 returns to step 405.

If at step 408, the message entry is not valid for the Tx process 332, the Tx process 332 directly proceeds to step 414, without reading or processing the message entry associated with the descriptor.

Figure 5:
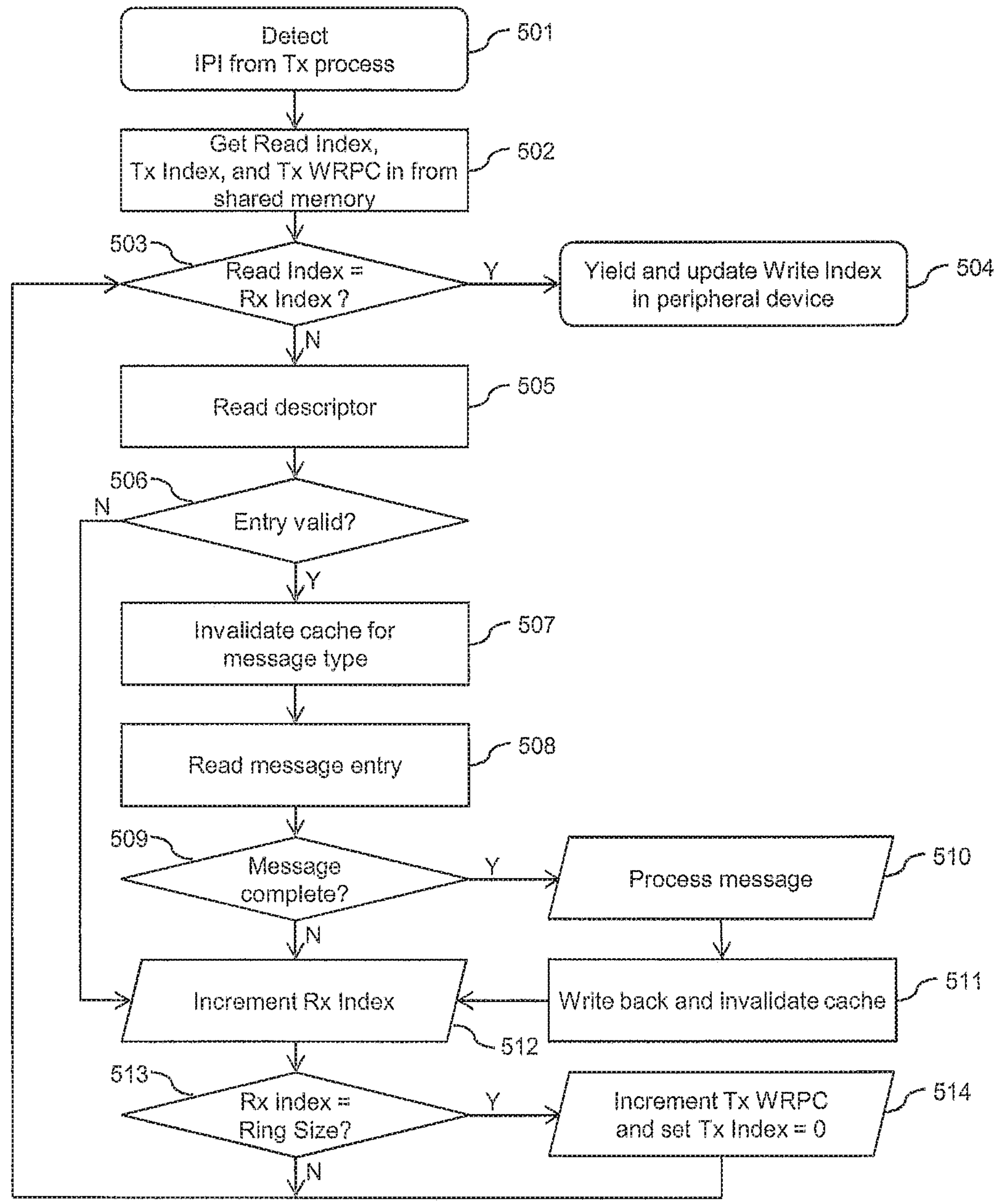
FIG. 5 shows a flowchart for illustrating a method implemented by a receive process of the procedure.

FIG. 5 shows a flowchart for illustrating a method for implementing the procedure of FIG. 3 in the Rx process 331.

At step 501 the Rx process 331 detects IPI from the Tx process 332, and at step 502 the Rx process 331 reads the Input Ring Read Index the Input Ring Read Index and the current Input Ring Tx Index and Tx WRPC from the shared memory location.

At step 503, the Rx process 331 checks if the Input Ring Rx Index is equal to the Input Ring Read Index. If this is the case, the Rx process 331 finishes processing and continues to step 504 as indicated by branch "Y". At step 504, the Rx process 331 also updates the Input Ring Write Index in the peripheral device. This involves comparing the Input Ring Tx Index and Tx WRPC to the Input Ring Rx Index and Rx WRPC, and updating the Write Index of the peripheral device with that one of the Input Ring Tx Index and Input Ring Rx Index which corresponds to the lower read pointer position. If the Tx WRPC is lower than the Rx WRPC, the Rx process 331 updates the Input Ring Write Index with the Input Ring Tx Index. If the Rx WRPC is lower than the Tx WRPC, the Rx process 331 updates the Input Ring Write Index with the Input Ring Rx Index. If the Tx WRPC and the Rx WRPC are the same and the Input Ring Tx Index is lower than the Input Ring Rx Index, the Rx process 331 updates the Input Ring Write Index with the Input Ring Tx Index. If the Tx WRPC and the Rx WRPC are the same and the Input Ring Rx Index is lower than the Input Ring Tx Index, the Rx process 331 updates the Input Ring Write Index with the Input Ring Rx Index.

If at step 504 the Input Ring Tx Index is not equal to the Input Ring Read Index, the Rx process 331 continues to step 505, as indicated by branch "N".

At step 505, the Rx process 331 uses the Input Ring Rx Index to read a descriptor from the descriptor ring and then proceeds to step 506 to check, based on the descriptor, if a message entry associated with the descriptor is valid for the Rx process 331, i.e., if the message entry is intended for processing by the Rx process 331. If this is the case, the Rx process 331 continues to step 507, as indicated by branch "Y". The descriptor may also indicate a message type included in the associated message entry.

At step 507, the Rx process 331 may invalidate a cache provided for the message type included in the message entry before reading the message entry at step 508. For reading the message entry, the Rx process 331 may again use the Input Ring Rx Index. That is to say, the Input Ring Rx Index may point both to the message entry and to the associated descriptor.

Having read the message entry, the Rx process 331 checks at step 509 if reading of a message is complete. In this way, it can be taken into account that multiple message entries may be needed for transferring one message. If reading of the message is complete, the Rx process 331 proceeds to step 510, as indicated by branch "Y".

At step 510, the Rx process 331 processes the message. At step 511, the Rx process 331 writes back results of the processing to the memory 120 of the processor device 100 and then invalidates the cache used during the processing of the message. The Rx process 331 then proceeds to step 512.

At step 512, the Rx process 331 increments the Input Ring Rx Index. At step 513, the Rx process 331 checks if the incremented Input Ring Rx Index is equal to the configured Input Ring Size. If this is the case, the Rx process 331 proceeds to step 514 to reset the Input Ring Rx Index to zero and increment the Rx WRPC, as indicated by branch "Y", and then returns to step 503.

If at step 513 the Input Ring Rx Index not yet equal to the Input Ring Size, the Rx process 331 directly returns to step 503, without the resetting of the Input Ring Rx Index and the incrementing of the Rx WRPC of step 514, as indicated by branch "N".

If at step 506, the message entry is not valid for the Rx process 331, the Rx process 331 directly proceeds to step 512, without reading or processing the message entry associated with the descriptor.

Figure 6:
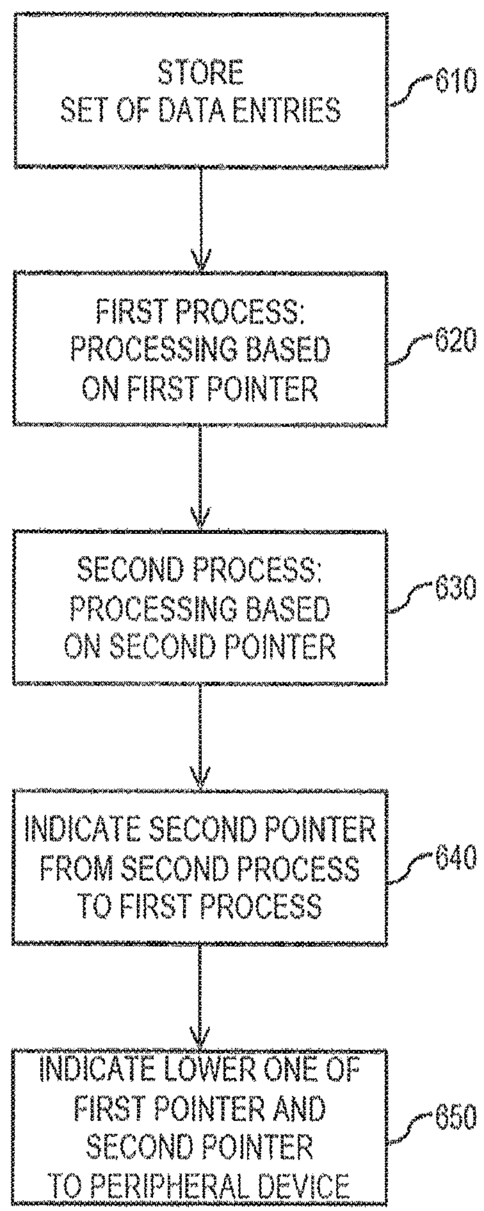
FIG. 6 shows a flowchart for illustrating a method according to an embodiment.

FIG. 6 shows a flowchart for illustrating a method of communicating data which may be used for implementing the above mentioned concepts. The steps of the method may for example be implemented by a processor device, such as the above-mentioned processor device 100. The processor device is assumed to execute multiple processes. Specifically, the processor device may execute a first process and a second process, such as the above-mentioned processes 131, 132, 331, 332. The first process may be a master process with respect to the second process.

The processor device may include one or more processors. If the processor device includes multiple processors, the first and second process may be executed by different processors. However, it is also possible that the first and second process are executed by the same processor. For example, the first and second process could be executed by different cores of the same processor.

Like explained in connection with the example of FIGS. 3 to 5, one of the first process may include or be a data reception process, such as the above-mentioned Rx process 331, while the other one of the first process and the second process includes or is a data sending process, such as the above-mentioned Tx process 331. The peripheral device may be a networking device, such as the above-mentioned networking device 350. However, other kinds of peripheral devices are possible as well, e.g., video or audio devices, external storage device, or interface devices.

The steps of the method may be implemented by execution of program code by one or more processors of the processor device. The program code may be stored in a memory of the processor device, e.g., the above-mentioned memory 120, and may be transferred to the memory using a computer readable medium, e.g., a compact disc, a digital versatile disc, a magnetic disc, a magneto-optical disc, a memory stick, or the like. Further, the transferring of the program code could also involve download or streaming of data.

At step 610, the processor device stores a set of data entries in a shared memory region, such as the above-mentioned memory region 121. The data entries are transferred via a memory mapped interface from an external peripheral device, such as the above mentioned peripheral device 200 or 350. The memory mapped interface may for example be based on a PCIe interface or an AMBA interface. As explained in connection with FIGS. 2 and 3, the shared memory region may be configured as a ring buffer.

At step 620, the first process executed by the processor device processes a first group of the data entries. This is accomplished based on a first pointer to the shared memory region. During the processing, the first pointer may be used for reading the data entries from the shared memory. When proceeding from one of the data entries to the next, the first process may increment the first read pointer.

At step 630, the first process executed by the processor device processes a second group of the data entries. This is accomplished based on a second pointer to the shared memory region. During the processing, the second pointer may be used for reading the data entries from the shared memory. When proceeding from one of the data entries to the next, the second process may increment the second read pointer.

The processing of the first group of the data entries by the first process and said processing of the second group of the data entries by the second process may be performed simultaneously.

The processing of the first group of the data entries by the first process and the processing of the second group of the data entries by the second process may be triggered simultaneously by an interrupt generated by the peripheral device.

In some scenarios, the processing of the first group of the data entries by the first process and the processing of the second group of the data entries by the second process may be triggered by a first interrupt message from the peripheral device to one of the first process and the second process, and a second interrupt message from the one of the first process and the second process to the other of the first process and the second process. A corresponding example is explained in connection with FIG. 3, where the processing is triggered by the MSI from the peripheral device 350 to the Tx process 332 and the IPI from the Tx process 332 to the Rx process 331.

At step 640, the second process indicates the second pointer to the first process. This may be accomplished in response to in response to completing processing of each data entry of the second group or in response to incrementing the second pointer.

At step 650, the first process indicates a lower one of the first pointer and the second pointer to the peripheral device. This may be accomplished in response to processing of the data entries of the first group being finished, e.g., because all available data entries were processed, because a timeout occurred, or because a maximum number of processed items, e.g., processed messages was reached.

The indicated lower one of the first pointer and the second pointer may be used by the peripheral device for controlling writing of further data entries into the shared memory region.

As can be seen, the illustrated concepts allow for efficiently communicating data from an external peripheral device to multiple processes executed by a processor device. Specifically, the concepts allow for achieving low usage of processor resources and memory resources of the processor device. Further, a low latency can be achieved for all processes. Still further, overhead related to management of the data communication is kept limited, because data transfers to both processes go through the same shared memory region and only one interrupt channel is needed for triggering processing by all processes.

It is to be understood that that the above-described concepts and embodiments are susceptible to various modifications. For example, the illustrated devices could be implemented on the basis of various kinds of processing technology, memory technology, or interface technology. Further, the illustrated concepts could be applied to any number of multiple processes executed the processor device. In this case, multiple processes could operate like explained above for the second process, e.g., in a scenario with one master process and multiple other processes which interact with the master process like explained above. Still further, it is noted that the illustrated functionalities may be implemented the basis of a program code executed by one or more processors of the processor device and/or on the basis of hardwired circuitry.

What is claimed is:

1. A method of communicating data, the method comprising:

a processor device storing a set of data entries in a shared memory region, the data entries being transferred via a memory mapped interface from an external peripheral device;

based on a first pointer to the shared memory region, a first process executed by the processor device processing a first group of the data entries;

based on a second pointer to the shared memory region, a second process executed by the processor device processing a second group of the data entries;

the second process indicating the second pointer to the first process; and the first process indicating a lower one of the first pointer and the second pointer to the peripheral device;

wherein said processing of the first group of the data entries by the first process and said processing of the second group of the data entries by the second process are simultaneously triggered by an interrupt generated by the peripheral device.

2. The method according to claim 1, comprising:

in response to completing processing of each data entry of the second group, the second process indicating the second pointer to the first process.

3. The method according to claim 1, comprising:

in response to processing of the data entries of the first group being finished, the first process indicating the lower one of the first pointer and the second pointer to the peripheral device.

4. The method according to claim 1, wherein said processing of the first group of the data entries by the first process and said processing of the second group of the data entries by the second process is performed simultaneously.

5. The method according to claim 1, wherein said processing of the first group of the data entries by the first process and said processing of the second group of the data entries by the second process are triggered by a first interrupt message from the peripheral device to one of the first process and the second process, and a second interrupt message from said one of the first process and the second process to the other of the first process and the second process.

6. The method according to claim 1, wherein the shared memory region is configured as a ring buffer.

7. The method according to claim 1, wherein one of the first process and the second process comprises a data reception process; and wherein the other one of the first process and the second process comprises a data sending process.

8. The method according to claim 1, wherein the peripheral device is a networking device.

9. The method according to claim 1, wherein the indicated lower one of the first pointer and the second pointer is to be used by the peripheral device for controlling writing of further data entries into the shared memory region.

10. The method according to claim 1, wherein the memory mapped interface is based on a Peripheral Component Interconnect Express, PCIe, interface or an Advanced Microcontroller Bus Architecture, AMBA, interface.

11. A processor device, comprising:

a memory;

a memory mapped interface to an external peripheral device; and at least one processor configured to execute a first process and a second process;

the memory being configured to store a set of data entries in a shared memory region, the data entries being transferred via the memory mapped interface from the peripheral device;

the first process being configured to process a first group of the data entries based on a first pointer to the shared memory region;

the second process being configured to process a second group of the data entries based on a second pointer to the shared memory region;

the second process being configured to indicate the second pointer to the first process;

the first process being configured to indicate a lower one of the first pointer and the second pointer to the peripheral device; and the peripheral device being configured to simultaneously trigger processing of the first group of the data entries by the first process and processing of the second group of the data entries by the second process by an interrupt.

12. The processor device according to claim 11, wherein the second process is configured to, in response to completing processing of each data entry of the second group, indicate the second pointer to the first process.

13. The processor device according to claim 11, wherein the first process is configured to, in response to processing of the data entries of the first group being finished, indicate the lower one of the first pointer and the second pointer to the peripheral device.

14. The processor device according to claim 11, wherein said processing of the first group of the data entries by the first process and said processing of the second group of the data entries by the second process is performed simultaneously.

15. The processor device according to claim 11, wherein said processing of the first group of the data entries by the first process and said processing of the second group of the data entries by the second process are triggered by a first interrupt message from the peripheral device to one of the first process and the second process, and a second interrupt message from said one of the first process and the second process to the other of the first process and the second process.

16. The processor device according to claim 11, wherein the shared memory region is configured as a ring buffer.

17. The processor device according to claim 11, wherein one of the first process and the second process comprises a data reception process; and wherein the other one of the first process and the second process comprises a data sending process.

18. The processor device according to claim 11, wherein the peripheral device is a networking device.

19. The processor device according to claim 11, wherein the indicated lower one of the first pointer and the second pointer is to be used by the peripheral device for controlling writing of further data entries into the shared memory region.

20. The processor device according to claim 11, wherein the memory mapped interface is based on a Peripheral Component Interconnect Express, PCIe, interface or an Advanced Microcontroller Bus Architecture, AMBA, interface.

21. A system, comprising:

a processor device; and an external peripheral device, the processor device comprising a memory, a memory mapped interface to the external peripheral device, and at least one processor configured to execute a first process and a second process;

the memory being configured to store a set of data entries in a shared memory region, the data entries being transferred via the memory mapped interface from the peripheral device;

the first process being configured to process a first group of the data entries based on a first pointer to the shared memory region;

the second process being configured to process a second group of the data entries based on a second pointer to the shared memory region;

the second process being configured to indicate the second pointer to the first process;

the first process being configured to indicate a lower one of the first pointer and the second pointer to the peripheral device; and the peripheral device being configured to simultaneously trigger processing of the first group of the data entries by the first process and processing of the second group of the data entries by the second process by an interrupt.

22. A non-transitory computer readable medium comprising instructions to be executed by at least one processor of a processor device, wherein execution of the instructions causes the processor device to:

store a set of data entries in a shared memory region, the data entries being transferred via a memory mapped interface from an external peripheral device execute a first process and a second process;

the first process being configured to process a first group of the data entries based on a first pointer to the shared memory region;

the second process being configured to process a second group of the data entries based on a second pointer to the shared memory region;

the second process being configured to indicate the second pointer to the first process;

the first process being configured to indicate a lower one of the first pointer and the second pointer to the peripheral device; and the peripheral device being configured to simultaneously trigger processing of the first group of the data entries by the first process and processing of the second group of the data entries by the second process by an interrupt.

* * * * *